United States Patent
Didinsky et al.

(10) Patent No.: US 6,289,268 B1
(45) Date of Patent: Sep. 11, 2001

(54) ATTITUDE DETERMINATION SYSTEM AND METHOD

(75) Inventors: Garry Didinsky, Morton Grove, IL (US); Arunkumar P. Nayak, Van Nuys, CA (US); Rongsheng Li, Hacienda Heights, CA (US); Yeong-Wei A. Wu, Rancho Palos Verdes, CA (US); Jeffrey A. Kurland, Marina Del Rey, CA (US); David D. Needelman, Torrance, CA (US)

(73) Assignee: Hughes Electronics Corp., El Segundo, CA (US)

( * ) Notice: Subject to any disclaimer, the term of this patent is extended or adjusted under 35 U.S.C. 154(b) by 0 days.

(21) Appl. No.: 09/516,854

(22) Filed: Mar. 2, 2000

(51) Int. Cl.⁷ .................................. G06F 7/00; G05D 3/00
(52) U.S. Cl. ............................ 701/13; 701/3; 701/221; 244/164; 244/171; 244/170; 244/165
(58) Field of Search .............................. 701/13; 244/169, 244/171, 166; 342/352, 357; 364/434, 455

(56) References Cited

U.S. PATENT DOCUMENTS

| | | | |
|---|---|---|---|
| 4,746,976 | * 5/1988 | Kamel et al. | 358/103 |
| 5,412,574 | * 5/1995 | Bender et al. | 364/455 |
| 5,508,932 | * 4/1996 | Achkar et al. | 364/459 |
| 5,546,309 | * 8/1996 | Johnson et al. | 364/434 |
| 5,745,869 | * 4/1998 | Van Bezooijen | 701/222 |
| 6,047,226 | * 4/2000 | Wu et al. | 701/13 |
| 6,108,593 | * 8/2000 | Didinsky et al. | 701/13 |
| 6,108,594 | * 8/2000 | Didinsky et al. | 701/13 |

* cited by examiner

Primary Examiner—William A. Cuchlinski, Jr.
Assistant Examiner—Tuan C To
(74) Attorney, Agent, or Firm—Terje Gudmestad

(57) ABSTRACT

A star tracker coupled to the spacecraft having a star catalog associated therewith. A sun sensor is coupled to the spacecraft. A control processor is coupled to the star tracker and the sun sensor. The processor obtains star data using a star tracker and an on-board star catalog. The processor generates a coarse attitude of the spacecraft as a function of the star data, and establishes a track on at least one star in the on-board star catalog. The processor calculates a sun tracking rate, and obtains a normal phase attitude as a function of the star data and the coarse attitude. The information is used to slew the spacecraft to a desired attitude.

23 Claims, 2 Drawing Sheets

ATTITUDE DETERMINATION SYSTEM AND METHOD

GOVERNMENT RIGHT

The present invention was made with government contract support. The government has certain rights in the invention.

TECHNICAL FIELD

The invention relates to spacecraft attitude determination and, more particularly, to a method of an improved attitude determination capable of both ground or spacecraft implementation while optimizing attitude determination performance.

BACKGROUND ART

It is often desirable to determine the attitude of a spacecraft for payload pointing purposes. Attitude refers to angular orientation of the spacecraft with respect to three orthogonal axes. Satellites typically employ attitude determination apparatus for pointing a payload such as a telescope or antenna to a desired location on the Earth. Conventional attitude sensing apparatus may include a satellite receiver such as a Global Positioning System (GPS), ground tracking apparatus for determining the satellite ephemerides, and star or sun trackers for transforming reference measurements determined in spacecraft body coordinates into a stellar, or orbital frame of reference. Various methods have been used to process attitude sensor data to determine spacecraft attitude.

Several methods of determining spacecraft attitude using Extended Kalman Filter (EKF) based algorithms have been proposed. These estimate the spacecraft attitude and gyroscope rate biases using various attitude sensor data. For example, see E. J. Lefferts, et al., "Kalman Filtering for Spacecraft Attitude Determination," A.I.A.A. Journal on Guidance, Control and Dynamics, September–October 1982, pp. 417–429; A. Wu, "Attitude Determination for GEO Satellites," NASA Goddard 1997 Flight Mechanics Symposium, Greenbelt, MD, May 19–21, 1997.

The EKF is an established estimation method for attitude determination. In particular, the Kalman filter provides optimal noise attenuation performance for both process and measurement noise. EKF filtering is ideally suited for systems wherein disturbances are white noise processes. A steady state Kalman filter is a simple (fixed gain) estimator for state dynamics and measurement equations which are time-invanrant. If either the state dynamics or measurement equations vary with time, however, the Kalman filter gains become time-varying.

To reduce the computational complexity of such a system, a fixed gain filter approach can be used such as a TRIAD-based system. The TRIAD method of attitude determination is described in M. D. Shuster et al., "Three-Axis Attitude Determination From Vector Observations," Journal of Guidance and Control, vol. 4, no. 1, January–February 1981. A fixed gain approach to attitude determination reduces the computational complexity of the system, however, performance significantly deviates from the optimal solution provided by an EKF design because it ignores the time-varying measurement geometry in the filter design.

One problem with known attitude determination techniques is that the rate of successful attitude acquisition is lower than desired. That is, a proper orientation may not be obtained. If this occurs, then the process may have to be run again. This may result in costly delays. Another problem with attitude acquisition is that the time for acquisition is relatively great. This also increases costs due to unavailability of the satellite.

SUMMARY OF THE INVENTION

In the present invention, the aforementioned drawbacks of prior systems are solved by providing an attitude determination system having a star tracker coupled to the spacecraft having a star catalog associated therewith. A sun sensor is coupled to the spacecraft. A control processor is coupled to the star tracker and the sun sensor. The processor obtains star data using a star tracker and an on-board star catalog. The processor generates a coarse estimate of the attitude of the spacecraft and sensor alignments as a function of the star data, and establishes a track on at least one star identified as corresponding to one entry in the on-board star catalog. The processor then obtains a normal phase attitude as a function of the star data and the coarse attitude.

Accordingly, an object of the present invention is to provide an improved spacecraft attitude determination method.

Another object of the present invention is to provide attitude control for a satellite that can be executed on the ground or on board the satellite, or a combination of the two.

One advantage of the present invention is that the probability of successful acquisition is improved over prior systems. Another advantage of the invention is that when the slews are performed, they are safe for the spacecraft from the standpoint of the power supply and thermally-sensitive surfaces.

Other objects and advantages of the invention will become apparent upon reading the following detailed description and appended claims, and upon reference to the accompanying drawings.

DETAILED DESCRIPTION OF THE INVENTION

Figure 1:
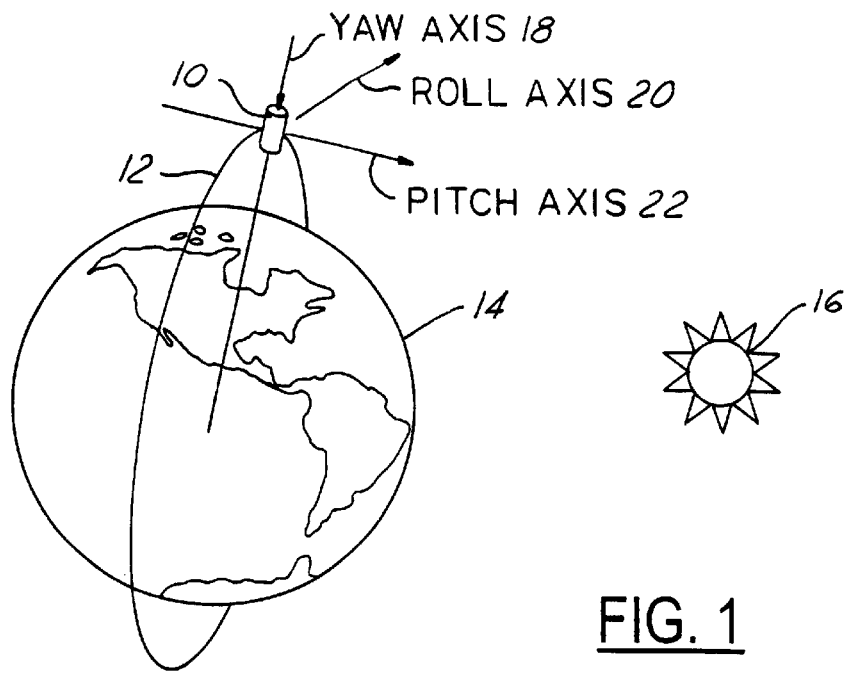
FIG. 1 is a diagrammatic representation of a satellite at an exemplary location relative to the Earth and Sun.

Referring to FIG. 1, a spacecraft (referred to hereafter as satellite 10) is shown in orbit 12 around the Earth 14. Three mutually orthogonal axes, labeled yaw axis 18, roll axis 20, and pitch axis 22, define a spacecraft frame of reference. The yaw axis 18 is coincident with the boresight of the satellite 10. The roll axis 20 is tangential to the orbit 12 in which the satellite 10 travels and the pitch axis 22 is orthogonal to the plane of the orbit 12. The illustrated orbit 12 is a Sun-synchronous orbit, as is characterized by the line of sight of the satellite 10 to the Sun 16 being coincident with the pitch axis 22. Alternatively, the satellite 10 may travel in a polar orbit, a geosynchronous orbit, or any other orbit appropriate to the satellite's mission.

The satellite 10 includes apparatus (see FIG. 2) for determining its attitude and for calibrating its sensors in order to continuously provide accurate attitude information.

More particularly, attitude refers to the orientation of the satellite or spacecraft with respect to three orthogonal reference axes fixed with respect to an inertial frame. The sensed attitude represents satellite angular orientation relative to the spacecraft frame of reference defined by the yaw axis 18, the roll axis 20, and the pitch axis 22. It is generally desirable to know the attitude of the satellite 10 with respect to the an orbital frame of reference by means of a direction cosine matrix which embodies the relation between the satellite body frame of reference and the orbital reference frame. A stellar (i.e., inertial) frame of reference is related to the orbital reference frame through ephemerides of the satellite and Earth. In the case where the satellite axes 18, 20, 22 are perfectly aligned with the orbital frame of reference, the pitch axis 22 of the satellite 10 is aligned with the orbital rate vectors. The attitude may be adjusted through use of actuators, including, but not limited to thrusters and momentum wheels.

Figure 2:
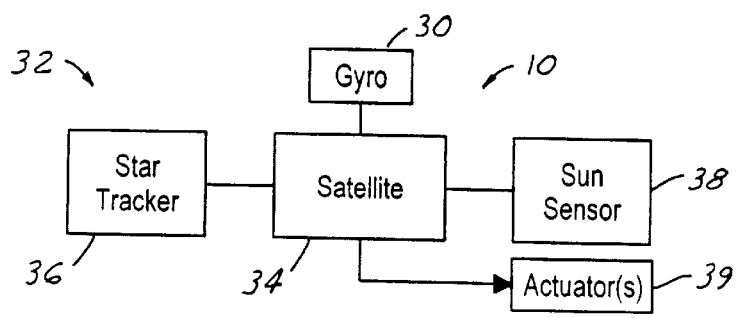
FIG. 2 is a functional block diagram of the attitude sensing apparatus according to the present invention.

FIG. 2 shows, in block diagram form, the major components of the satellite 10 necessary for attitude processing and control according to the present invention. For attitude determination, the satellite 10 includes gyroscopes 30, attitude sensors 32 and a control processor 34. For attitude control, the satellite 10 includes actuators 39, and a control processor 34.

Gyroscopes 30 located on the satellite 10 measure rotational rates experienced by the satellite 10 relative to the spacecraft frame of reference. The gyroscopes 30 measure the rotational rates of the satellite 10 with respect to the three mutually orthogonal axes 18, 20, 22 and update the aforementioned direction cosine matrix using the sensed rates. Similarly, attitude sensors 32 such as a star tracker 36, a sun sensor 38, or other attitude sensors such as Earth sensors, and/or beacons, provide a reference measurement to the respective sensed source. Only one star tracker 36 and one sensor 38 are illustrated, however, one skilled in the art would recognize that more than one may be implemented.

While the gyroscopes 30 and attitude sensors 32 provide suitable means for updating the attitude of the satellite 10 between successive determinations, such measurement units are susceptible to drift over time, resulting in error in the sensed rotational rates and thus, in the resulting attitude information. In the present invention, the attitude information maintained or stored by the gyroscopes 30 and the attitude sensors 32 of the satellite 10 is periodically calibrated, or corrected in order to compensate for gyroscopic and sensor-introduced errors.

The spacecraft control processor 34 is responsible for processing the gyroscope and attitude sensor data to correct the spacecraft attitude estimate and gyroscope rate bias estimates. With such information, the actuator(s) 39 may be used to maintain the satellite 10 in its desired attitude as will be further described below.

Figure 3:
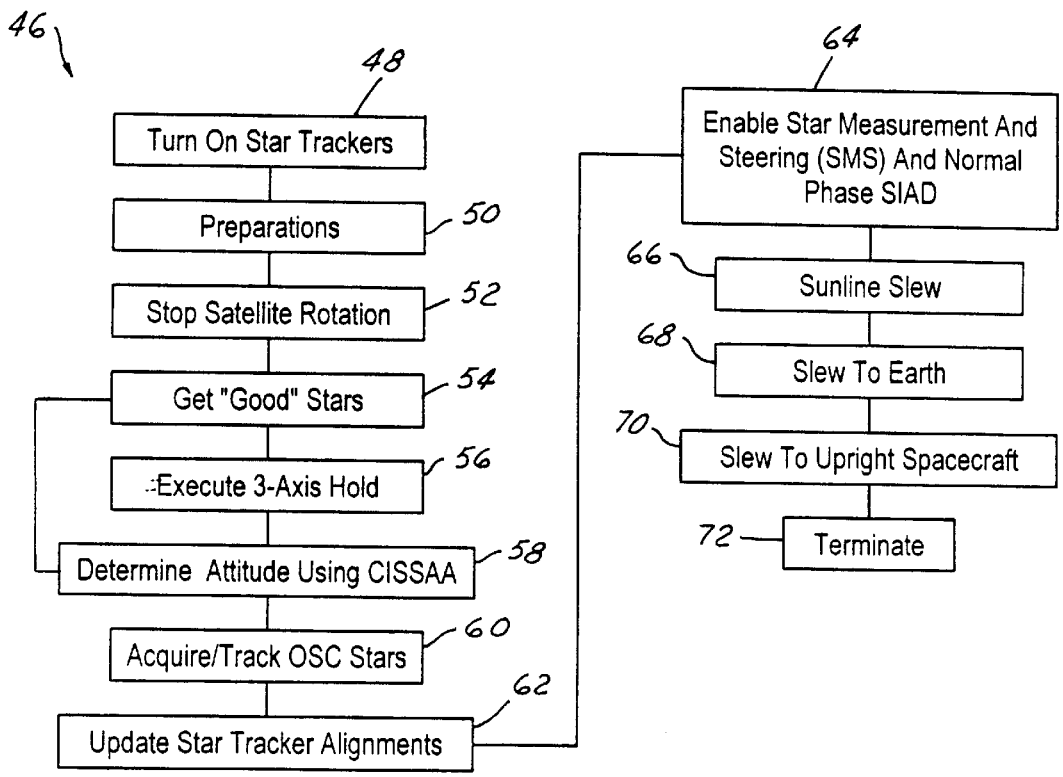
FIG. 3 is a flow chart of a method for attitude determination according to the present invention.

Referring now to FIG. 3, a flow chart for attitude determination of a spacecraft in sun-hold mode is illustrated. The sun-hold mode is entered after the spacecraft has been oriented correctly with respect to the sun. That is, the sun sensor line of sight points toward the sun and the spacecraft is rotating about the sun sensor line of sight. The sun-hold mode is typically entered after initial solar array deployment, after a serious anomaly or after coming out of "storage." In sun-hold mode, no estimate exists for attitude.

Generally, both of the following methods use star tracker data for the attitude algorithm. In an initial phase, the attitude acquisition method is design to use a minimum amount of star tracker data. An estimate of attitude is obtained in this orientation. Then, using a normal phase attitude determination, the initial determination is verified. The following method may also include earth-pointing attitude determination. Preferably, the following steps are used as part of an operating procedure for stellar inertial attitude determination (SIAD). Also, the progress of the attitude determination may be monitored from the ground.

In FIG. 3, a sun-hold mode attitude acquisition procedure 46 is illustrated. In step 48 the star trackers illustrated above as 36 are turned on if they are not already turned on. Commonly, star trackers provide some data within thirty seconds of turn on and usable data some time thereafter. Usable data may be obtained, for example, in about thirty minutes if a Ball CT-602 star tracker is used. Of course, implementation with other types of star trackers is contemplated. Each particular star tracker has its own turn on procedure. The procedures may, for example, involve verifying that the temperature and background intensity are within a certain limit and that various other functional indicators are positive. Of course, the star tracker should be capable of tracking stars at the spacecraft rotation rate.

In step 50, specific preparations for the attitude acquisition procedure must be performed. For example, the spacecraft clock must be set to coordinate with the ground system. The clock must be set, for example, to .within about ten seconds of a standard time reference J2000 time (Jan. 1, 2000). Other preparations include uploading the orbit ephemeris based on the most recent ranging. Another preparation that should be performed is uploading an on-board star catalog (OSC) from the ground station.

In step 52, the satellite rotation is stopped. Rotation is accomplished using actuators such as momentum wheels as would be evident to those skilled in the art. As mentioned above, in the sun-hold mode procedure 46, the satellite is rotating about the sunline (the sun sensor line of sight). In this step, the actuators are commanded to stop or nearly stop, inducing rotation. In some implementations, a rotation rate of approximately one degree per day is required to keep the sun on the sun sensor boresight. Information from the gyroscope 30 is used to provide feedback to the actuators to eliminate the rotation. As a practical matter, the rotation about the sunline is nearly impossible to completely eliminate. This is due primarily due to gyroscope errors such as bias, scale factor drift and misalignment. However, a small amount of rotation will not interfere with the following steps. The time when step 52 is performed should be chosen to allow continuous telemetry and command coverage between the ground station and the satellite. By substantially stopping the rotation of a satellite, the stars viewed by the star tracker remain relatively constant to simplify the acquisition procedure.

In step 54, the star tracker tries to obtain data on an optimal set of stars. Starts that are dim or distributed too closely together are not as desirable as bright starts. Therefore, if the star tracker is tracking undesirable stars the star tracker may be commanded to break its track and establish a track on a different star within the field of view (FOV). Preferably, if multiple star trackers are used, at least one star tracker is tracking at least three stars.

During step 54, if repeated break-tracks are performed without a satisfactory set of stars being obtained, the spacecraft may then be commanded to slew. The spacecraft may be slewed about the sunline to keep the sun in the sun sensor line of sight. The slew chosen should have the minimum magnitude so that the field of view of the star trackers does not overlap the current field of view. Also, it is preferable to prevent the diminishment of telemetry and command coverage.

If telemetry and command coverage is degraded due to a slew, a slew in the opposite direction will bring the vehicle back to its origination point. This type of procedure is commonly performed in satellite slewing procedures. This prevents loss of telemetry and command between the ground station and the satellite. Each time a slew is performed, an opposite delay slew is commanded autonomously if the telemetry and command coverage degrades.

If too many slews are performed without successful telemetry and command communication, and an anomaly may be declared. When an anomaly is declared, the procedure will be halted.

In step 56, a three-axis hold is executed. In step 52, rotation about the sunline is eliminated. However, another reference point is needed to completely stop all spacecraft rotation about the sunline. As a reference point, a first pseudo-star, which is a bright star tracked by one of the star trackers, is chosen for its proximity to the star tracker bore site. The momentum wheels and the TRIAD algorithm are used to keep the pseudo-star fixed in a spacecraft point of view in the plane defined by the sun position and the pseudo-star original position. Another reference point in addition to the first pseudo-star is also used. The second pseudo-star may be another bright star or may be the sun tracked by the sun sensor. As will be evident to those skilled in the art, if the sun is used as the second pseudo-star, the spacecraft will rotate at approximately one degree per day. However, this rate is not fast enough to affect the following steps. By performing the three-axis hold, the spacecraft rotation rate is known and may be controlled precisely. The onboard three-axis gyro provides the spacecraft rate estimate. By comparing the gyro rate to the actual rate, the gyro bias may then be estimated.

In step 58, a coarse attitude estimate is determined. The coarse attitude may, for example, be obtained through a "confused-in-space" (knowing minimal information) procedure. At the end of the coarse attitude acquisition, a flag will be set in the controller indicating a success of the attitude determination attempt. A number of star trackers may be turned off after coarse adjustment because they will not be used in the normal phase.

If an attempt to determine attitude is not successful, the track on all the stars in the star tracker's field of view is broken. As described above in step 54, acquisition of a new set of stars may be performed. In this situation the procedure will return to step 54.

After a successful attempt to determine attitude in step 58, step 60 is executed. The star catalog of step 58 may be larger than the on-board star catalog for the normal phase as described below. Thus, in preparation for the normal phase, a track is established on at least one onboard star catalog star in each of at least two star trackers, even if doing so requires breaking track on non-on-board star catalog stars. If this condition cannot be met, another slew about the sunline is executed. Thus, control returns to step 58. Because coarse attitude is known, the slew can be designed to obtain at least one star catalog star in the field of view of at least two star trackers.

In step 62, the direction cosine matrices, the last output from step 60, and the bore sight vectors for each star tracker are uploaded.

Prior to uploading, the pseudo-star spacecraft rotation, if any, is disabled. Thus, after uploading, the control is maintained in the pseudo-star original position from step 56.

In step 64, the onboard star measurement and steering software (SMS) is engaged. The SMS identifies tracked stars as corresponding to the onboard star catalog entries and commands the star trackers to track new onboard star catalog stars after the previously tracked stars move out of the field of view. In step 64, the normal phase stellar inertial attitude determination (SIAD) normal phase algorithm is also employed. The normal phase SIAD is used to determine a fine attitude spacecraft. In the normal phase it assumes that the attitude estimate/gyro bias covariance is set to a default value. During the normal phase SIAD determination, the star identifications are maintained. The initial point of the normal phase SIAD is the coarse attitude determined above which is corrected for time, the gyro bias and identification of all the catalog stars tracked.

During execution of the normal phase SIAD, star residuals are calculated. A star residual is the difference between the observed position of the tracked/identified star and its predicted position. The predicted position is calculated by the star measurement and steering software using estimated attitude and the onboard star catalog. The star residuals are monitored to verify that they converge over time.

Once a fine attitude determination has been performed, a sun slew in step 56 in performed. In step 66, a slew about the sunline is commanded. The duration of the slew is dependent on the particular satellite and the attitude of the satellite. The slew rate is preferably the largest value for which the star trackers continue to track stars and which the normal phase SIAD continues to function. For the BALL CT-602 star trackers, rates up to 0.4 degrees per second may be achieved. For the normal phase to continue to function properly, the gyroscope and star tracker update rates must be maintained. For some known hardware, rates of 0.25 degrees per second may be used.

The normal phase SIAD functions correctly throughout the slew if during the slew a threshold number of stars in each of the star tracker's field of view may be identified, and the magnitude of the star residuals remains under some predetermined threshold. If these conditions are met, a slew to Earth may be performed since spacecraft's orientation with respect to the Earth is known. If the normal phase SIAD does not function properly, an anomaly may be declared.

In step 68, a slew to earth is performed. During the step, the solar array is commanded to track the sun during the slew to Earth. The array is commanded to rotate in steps about the spacecraft pitch axis at a frequency such that the array constantly faces the sun. After this is performed the spacecraft is commanded to acquire Earth pointing attitude beginning with a slew to Earth. The slew rate is small enough to allow the normal phase SIAD to operate properly. At the end of the Earth slew, the spacecraft yaw axis is pointing toward the center of the Earth and the spacecraft pitch axis is perpendicular to the plane of the spacecraft orbit. Thus, under these conditions, the spacecraft telemetry and command is always available and the solar arrays are illuminated.

If step 70, it is possible for the orientation of the spacecraft to be 180° away from the desired location. That is, a 180° rotation about the yaw axis may be required. Those skilled in the art would recognize this is commonly called a "yaw flip." If a yaw flip is needed, spacecraft dependent time constraints will limit the time to perform this maneuver. Time constraints are due to the desire not to heat the payload coolers during the yaw flip. Preferably the yaw flip is performed at a slow rate so that the normal phase SIAD may be maintained.

Of course, those skilled in the art would recognize that a yaw flip may be completely avoided during a slew to the Earth. However, various satellite program-dependent trades may be required.

Figure 4:
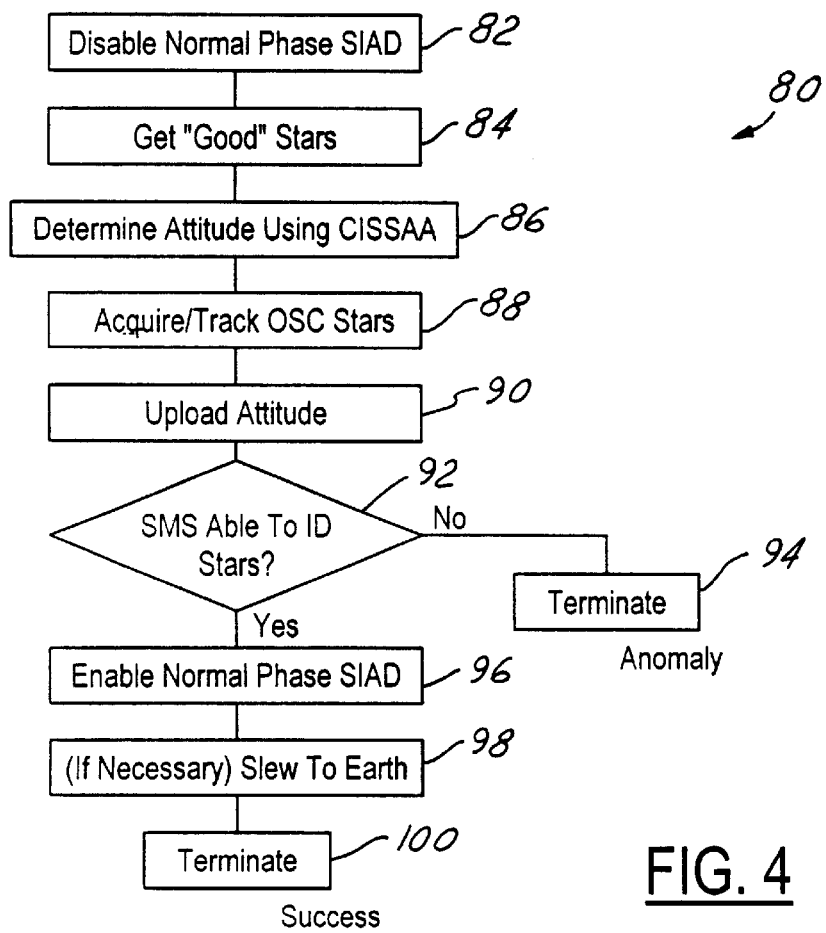
FIG. 4 is a flow chart of an alternative method for attitude determination according to the present invention.

Referring now to FIG. 4, an attitude determination process that starts from a loss of attitude is illustrated. Process 80 is particularly suited for a loss of attitude between about 0.2 degrees but less than 2°, although it will work for larger attitude knowledge errors, at the expense of longer execution times. In step 82, if the normal phase SIAD is enabled, it is disabled in step 82. This is due to the fact that if attitude has been lost, only gyro measurements are used to propagate the attitude estimate. In step 84, the same process as step 54 is performed. Step 86 is similar to step 58. That is, a coarse determination may be made as to the attitude. However, in this case no sun position knowledge is used. Star tracker and sun sensor orientation are not calculated and time and attitude are not calculated for a user supply time but for the current time. Step 88 is similar to step 60 above wherein the onboard star catalog stars are acquired. In step 90, the attitude is uploaded. In step 92, the star measurement and steering software is checked to determine whether it can identify stars. That is, the stars identified in step 88 must be able to be identified. If the stars identified in step 88 cannot be tracked, new stars are identified. If tracking cannot be established after some period of time, an anomaly exists and the process is terminated.

If the stars identified in step 88 are able to be tracked, step 96 is enabled. In step 96, the normal phase SIAD is run in a similar manner to step 64 described above except that the star measurement and steering control is already engaged. In step 96, the attitude estimate and gyro bias estimate covariances are reset to their initial values. As described above, step 96 provides a fine adjustment to attitude.

After normal phase SIAD is operating, it may be necessary to slew to the Earth. In step 98, a slew to the Earth is performed. A slew to the Earth is performed in a similar manner to that shown in step 68 above. Thus, using a similar procedure both attitude adjustment starting from a sun-hold mode and starting from a rough initial attitude may be performed.

While the invention was described in connection with one or more embodiments, it will be understood that the invention is not limited to those embodiments. On the contrary, the invention includes all alternatives, modifications, and equivalents as may be included within the spirit and scope of the appended claims.

What is claimed is:

1. An attitude control system for controlling an attitude of a spacecraft comprising:
    a star tracker coupled to said spacecraft having a star catalog associated therewith;
    a sun sensor coupled to said spacecraft;
    an actuator coupled to the spacecraft for adjusting spacecraft orientation with respect to an inertial frame;
    a control processor coupled to the star tracker and said sun sensor, said processor obtaining a star data using a star tracker and an on-board star catalog, generating a coarse attitude estimate of said spacecraft as a function of said star data; establishing a track on at least one star in said on-board star catalog; calculating a sun tracking rate; and obtaining a normal phase attitude estimate after the step of establishing a track as a function of a sun tracking rate, said star data and said coarse attitude; commanding said actuator to adjust attitude in response to said normal phase attitude.

2. An attitude control system as recited in claim 1 wherein said control processor comprises a spacecraft control processor.

3. An attitude control system as recited in claim 1 wherein said control processor comprises a ground control processor.

4. An attitude control system as recited in claim 1 further comprising a gyroscope generating a gyroscope signal, said processor propagating an attitude estimate as a base of said gyroscope signal.

5. A method of controlling the attitude of a spacecraft comprising the steps of:
    obtaining a star data using a star tracker and an on-board star catalog;
    generating a coarse attitude estimate of said spacecraft as a function of said star data;
    establishing a track on at least one star in said on-board star catalog; calculating a sun tracking rate;
    obtaining a normal phase attitude after the step of establishing a track as a function of a sun tracking rate, said star data and said coarse attitude; and
    slewing the spacecraft to some desired orientation.

6. A method as recited in claim 5 further comprising preparing the satellite for attitude determination.

7. A method as recited in claim 6 wherein said step of preparing comprises uploading orbit ephemeris.

8. A method as recited in claim 6 wherein said step of preparing comprises uploading an on-board star catalog.

9. A method as recited in claim 5 further comprising the step of stopping a rotation of said satellite.

10. A method as recited in claim 5 performing a three axis hold.

11. A method as recited in claim 10 wherein the step of performing a three axis hold comprises eliminating a spacecraft rotation about a sunline; choosing a reference object from a star tracker to establish a reference point, tracking on the object.

12. A method as recited in claim 11 further comprising the step of establishing a second reference point.

13. A method as recited in claim 12 wherein said second reference point comprises the sun.

14. A method as recited in claim 12 wherein said second reference point is a bright star.

15. A method as recited in claim 10 further comprising the determining a gyro bias after the step of executing a three axis hold.

16. A method as recited in claim 5 further comprising the steps of obtaining a star tracker alignment.

17. A method as recited in claim 5 further comprising the step of identifying tracked stars and commanding said star trackers to track another star from said on-board star catalog.

18. A method as recited in claim 5 further comprising the step of slewing the satellite about a sunline.

19. A method as recited in claim 5 further comprising the step of slewing the satellite to Earth.

20. A method as recited in claim 5 further comprising the step of uprighting the spacecraft, by performing a yaw-flip.

21. A method as recited in claim 5 further comprising the step of terminating the attitude procedure when an anomaly is determined.

22. A method as recited in claim 5 further comprising the step of determining the alignment of the star trackers with respect to the spacecraft.

23. A method as recited in claim 22 wherein the step of orienting a star tracker comprises rotating the spacecraft.

* * * * *